United States Patent
Mager et al.

(10) Patent No.: US 6,201,051 B1
(45) Date of Patent: Mar. 13, 2001

(54) CONDUCTING ORGANIC-INORGANIC HYBRID MATERIALS

(75) Inventors: Michael Mager, Leverkusen; Friedrich Jonas, Aachen; Aloys Eiling, Bochum; Udo Guntermann, Krefeld, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/319,067

(22) PCT Filed: Nov. 24, 1997

(86) PCT No.: PCT/EP97/06559

§ 371 Date: May 28, 1999

§ 102(e) Date: May 28, 1999

(87) PCT Pub. No.: WO98/25274

PCT Pub. Date: Jun. 11, 1998

(30) Foreign Application Priority Data

Dec. 4, 1996 (DE) ............................................. 196 59 147

(51) Int. Cl.$^7$ ................................. C08J 3/00; C08K 5/24; C08K 5/00; C08L 81/00; C08L 83/00
(52) U.S. Cl. ........................... 524/261; 524/183; 524/266; 524/368; 524/394; 524/404; 524/413; 524/430; 524/437; 524/588; 524/609; 525/100; 525/101; 525/417
(58) Field of Search ...................................... 524/261, 183, 524/266, 368, 394, 404, 413, 430, 437, 588, 609; 525/100, 101, 417

(56) References Cited

U.S. PATENT DOCUMENTS

| 4,959,430 | 9/1990 | Jonas et al. | 526/257 |
| 4,987,042 | 1/1991 | Jonas et al. | 429/213 |
| 5,035,926 | 7/1991 | Jonas et al. | 427/393.1 |
| 5,300,575 | 4/1994 | Jonas et al. | 525/186 |
| 5,742,119 | 4/1998 | Aben et al. | 313/479 |

FOREIGN PATENT DOCUMENTS

| 4211459 | 10/1993 | (DE) . |
| 4229192 | 3/1994 | (DE) . |

OTHER PUBLICATIONS

Derwent Abstract 95–117751 of JP 07025885A (Shown Denko KK) Supplied With Applicant's PCT Documents, Jan. 27, 1995.*

* cited by examiner

*Primary Examiner*—Patrick D. Niland
(74) *Attorney, Agent, or Firm*—Joseph C. Gil; Thomas W. Roy

(57) ABSTRACT

The present invention relates to mixtures of conducting organic polymers and reaction products of polyfunctional organosilanes, conducting organic-inorganic hybrid materials obtained therefrom, and their use for coating surfaces.

2 Claims, No Drawings

CONDUCTING ORGANIC-INORGANIC HYBRID MATERIALS

FIELD OF THE INVENTION

The present invention relates to mixtures of conducting organic polymers and reaction products of polyfunctional organosilanes, conducting organic-inorganic hybrid materials obtained therefrom, and their use for coating surfaces.

BACKGROUND OF THE INVENTION

Glass moulded parts and plastics moulded parts become electrostatically charged by friction or application of charges, for example electron beams in TV picture tubes. As a result of these charges the moulded parts rapidly become covered with dust due to attraction of dust, which is undesirable in practice. There is therefore the need to protect these moulded parts against electrostatic charging. This protection can be achieved for example by coating the moulded parts with an antistatic coating. Following the definition given in ISO 2878, antistatic materials are understood to be those having surface resistances of between 50 $k\Omega/\square$ and 100 $M\Omega/\square$. Conducting materials are defined as those having surface resistances of <50 $k\Omega/\square$.

With sufficiently conducting materials, in addition to the antistatic effect a screening effect against electromagnetic radiation, as is emitted for example from cathode ray tubes, is also achieved. For an effective radiation screening the surface resistance must be less than 3 $k\Omega/\square$.

For practical use these coatings must also have a sufficient mechanical strength and adhesion. Especially in the case of glass as carrier, the layers must be sufficiently scratch-resistant in order to avoid damage to the coating when cleaning the coated surfaces and thus loss of the antistatic and/or conducting effect.

Electrically conducting polymers, for example polythiopenes, for producing antistatic and/or conducting coatings are known from the literature Examples thereof may be found in EP-A 440 957 and DE-OS 42 11 459.

The use of these polythiophene salts for giving glass an antistatic finish is described in DE-OS 42 29 192. It has been found however that these coatings are not sufficiently scratch-resistant in practice for some applications.

Scratch-resistant coatings based on hydrolysed siloxanes are known from EP-A 17 187. These however are not compatible with preparations of polythiophene salts.

Poly-3,4-ethylenedioxythiophene-containing coatings on image screens are described in WO 96/05606. In order to improve the scratch resistance of the coatings and obtain anti-reflecting properties, layers of $SiO_2$ and/or $TiO_2$ obtained for example from metal alkoxides are applied thereto via the sol-gel process.

A disadvantage is that already with layer thicknesses that are only slightly more than 100 nm, the transmission falls below 60%. The layer must therefore have exactly the same thickness over the whole surface. The reproducible application of such thin coatings is however technically difficult.

A further disadvantage of this process is that conducting coatings having the required scratch resistance can only be obtained if the conducting layer is provided with at least one scratch-resistant covering layer. To obtain suitable coatings having anti-reflecting properties it is necessary to apply up to four different layers in succession. This is technically extremely complicated. Also, with each additional layer there is an increasing danger that the overall laminar composite will exhibit a defect.

The object of the present invention was accordingly to provide mixtures which, when applied to suitable substrates, produce after removal of the solvents firmly adhering, conducting coatings having improved scratch resistance and transmission of visible light.

It has now been found that the aforementioned requirements can be fulfilled if mixtures of conducting organic polymers with reaction products of polyfunctional organosilanes and optionally further components such as metal alkoxides, metal oxides or metal oxide-hydroxides are used.

SUMMARY OF THE INVENTION

The present invention accordingly provides mixture containing:
A) preparations of polythiophenes,
B) reaction products of polyfunctional organosilanes,
C) optionally reaction products of alkoxides of the elements B, Al, Si, Sn, Ti, Zr,
D) optionally metal oxides or metal oxide-hydroxides of the elements B, Al, In, Si, Sn, Ti, Zr,
E) Solvents

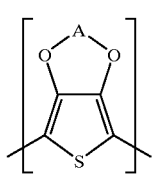

(I)

DESCRIPTION OF THE INVENTION

As component A), there are preferably used preparations of polythiophenes such as are described in DE-OS 42 11 459, EP-A 339 340 and EP-A 440 957. The preparations contain polythiophene salts of the type polythiophene$^{m+}$, An$^{m-}$, wherein the polythiophene cation polythiophene$^{m+}$ contains positively charged or uncharged units of the formula (I), wherein A denotes a $C_1$–$C_4$-alkylene radical optionally substituted with $C_1$–$C_{20}$ alkyl-, —$CH_2OH$ or $C_6$–$C_{14}$-aryl groups. The number of units in the polythiophene cation may be between 5 and 100.

An$^{m-}$ denotes a polyanion.

Examples of polyanions that may be used according to the invention are the anions of polymeric carboxylic acids such as polyacrylic acids, polymethacrylic acids, polymaleic acids, as well as anions of polymeric sulfonic acids such as polystyrenesulfonic acids and polyvinylsulfonic acids. These polycarboxylic acids and polysulfonic acids may also be copolymers of vinylcarboxylic acids and vinylsulfonic acids with other polymerisable monomers such as acrylic acid esters and styrene.

The mean molecular weight $\overline{M}$ of the polymeric acids from which are derived the polyanions that may be used according to the invention is 1000 to 2,000,000, preferably 2000 to 500,000. The polymeric acids or their alkali salts are commercially available or can be prepared by methods known per se, such as those described for example in Houben-Weyl: "Methoden der organischen Chemie", Vol. E20, "Makromolekulare Stoffe", Part 2, p. 1141 ff.

The mixtures according to the invention contain as component B) reaction products of polyfunctional organosilanes. Polyfunctional organosilanes within the context of the invention are those that contain at least 2, preferably at least 3 silicon atoms per molecule, that in each case contain 1 to 3 alkoxy or hydroxyl groups, and that are coupled via at least one Si—C bond to a structural unit joining two silicon atoms.

Bonding structural units within the context of the invention may in the simplest case be linear or branched $C_1$ to $C_{10}$-alkylene chains, $C_5$ to $C_{10}$-cycloalkylene radicals, aromatic radicals such as phenyl, naphthyl or biphenyl, or also combinations of aromatic and aliphatic radicals. The aliphatic and aromatic radicals may also contain hetero atoms such as Si, N, O, S or F. Furthermore, chain, ring or cage siloxanes, for example silsesquioxanes, may be mentioned as coupling structural units.

Examples of coupling structural units are given hereinafter, wherein X denotes Si atoms that contain 1 to 3 hydrolysable and/or condensation-crosslinking groups, and Y denotes corresponding Si atoms that are bound via an alkylene chain to the coupling structural unit; n denotes a number from 1 to 10, and m denotes a number from 1 to 6:

wherein R is an organic radical, for example alkyl, cycloalkyl, aryl or alkenyl.

Examples of polyfunctional organosilanes are compounds of the general formula (II)

$$R^3{}_{4-i}Si[(CH_2)_nSi(OR^4)_aR^5{}_{3-a}]_i \qquad (II)$$

where
   i=2 to 4, preferably i=4,
   n=1 to 10, preferably n=2 to 4, particularly n=2, and
   $R^3$=alkyl or aryl,
   $R^5$=alkyl or aryl, preferably $R^5$=methyl,
   a=1 to 3,
   wherein
      $R^4$=alkyl, aryl, preferably $R^4$=methyl, ethyl, isopropyl;
      in the case where a=1, $R^4$ may also be hydrogen.

Further examples are cyclic compounds of the general formula (III)

$$\left[ \begin{array}{c} Si(OR^7)_cR^8{}_{3-c} \\ | \\ (CH_2)_n \\ | \\ -Si-O- \\ | \\ R^5 \end{array} \right]_m \qquad (III)$$

where
   m=3 to 6, preferably m=3 or 4,
   n=2 to 10, preferably n=2,
   $R^6=C_1-C_6$ alkyl or $C_6-C_{14}$ aryl, preferably $R^6$=methyl, ethyl, particularly preferably $R^6$=methyl,
   $R^8$=alkyl, aryl, preferably $R^8$=methyl,
   C=up to 3, wherein
   $R^7$=alkyl, aryl, preferably $R^7$=methyl, ethyl, isopropyl;
   in the case where c=1, $R^7$ may also be hydrogen.

Further examples of polyfunctional organosilanes are compounds of the general formula (IV)

$$Si[OSiR^{11}{}_2(CH_2)_pSi(OR^9)_dR^{10}{}_{3-d}]_4 \qquad (IV)$$

where
   p=1 to 10, preferably p=2 to 4, particularly preferably p=2,
   $R^{11}$=alkyl, aryl, preferably $R^{11}$=methyl,
   $R^{10}$=alkyl, aryl, preferably $R^{10}$=methyl,
   d=1 to 3, wherein
   $R^9$=alkyl, aryl, preferably $R^9$=methyl, ethyl, isopropyl;
   in the case where d=1, $R^9$ may also be hydrogen.

Examples of polyfunctional organosilanes according to the invention are also silanols such as $Si[(CH_2)_2Si(OH)(CH_3)_2]_4$ and cyclo-$[OSiMe((CH_2)_2Si(OH)Me_2)]_4$, or alkoxides such as cyclo-$[OSiMe((CH_2)_2Si(OEt)_2Me)]_4$ and cyclo-$[OSiMe((CH_2)_2Si(OMe)Me_2)]_4$.

The mixtures according to the invention may contain as component C) reaction products of alkoxides of the elements B, Al, Si, Sn, Ti, Zr.

The alkoxides that may be used in the preparation of the mixtures according to the invention preferably correspond to the general formula $M(OR)_y$, where y has the value 3 if M denotes boron or aluminium, and y has the value 4 if M denotes silicon, tin, titanium or zirconium. Examples of alkoxides that may be added in the preparation of the mixtures according to the invention in order to improve the scratch resistance of coatings produced therefrom are $Si(OEt)_4$, $Al(O^iPr)_3$ or $Zr(O^iPr)_4$, preferably $Si(OEt)_4$. By adding titanium alkoxides, for example $Ti(O^iPr)_4$ or Ti(O"Bu)$_4$, the refraction index of the conducting, organic-inorganic hybrid material produced from the mixtures according to the invention can be increased. During the production process of the mixtures according to the invention, solvolysis products and condensation products are formed from the alkoxides, for example by reaction with the solvent, polyfunctional organosilanes, polythiophene preparations, catalysts or by self-condensation. In order to reduce the reactivity of readily hydrolysable and condensable metal alkoxides and to avoid the formation of deposits, these metal alkoxides may first of all already be reacted with water before they react with the polyfunctional organosilanes. These solvolysis products and condensation products form the component C) of the mixtures according to the invention.

Details of the hydrolysis and condensation of polyfunctional organosilanes and their mixtures with metal oxides may be found for example in DE-OS 196 03 242, German Patent Application 196 03 241.5 and WO 94/06807.

The polyfunctional organosilanes are reacted with water in the presence of a catalyst, preferably in a solvent, for example an alcohol, and optionally in the presence of metal alkoxides. Inorganic or organic acids, for example formic acid, are used as catalysts. The solvolysis and condensation products of the polyfunctional organosilanes form the component B) of the mixtures according to the invention.

The mixtures according to the invention may contain as component D) metal oxides or metal oxide-hydroxides of the elements B, Al, In, Si, Sn, Ti or Zr. Mixed metal oxides, for example indium-tin oxides (ITO) may also be used. In order to obtain transparent coatings, particles with primary particle sizes in the range from 1 to 50 nm are preferably used. Their incorporation in the mixtures according to the invention is best achieved by adding the particles as a dispersion in a solvent, for example water or alcohols. A dispersion of SiO$_2$ (primary particle size ca. 9 nm) in isopropanol may be mentioned by way of example.

By adding fillers such as glass powder, calcium carbonate, calcium sulfate, barium sulfate or layer-type silicates (talcum, kaolin, mica), the conductivity of the amorphous organic-inorganic hybrid materials obtainable from the mixtures according to the invention may be improved still further.

The mixtures according to the invention are prepared from the reactive solutions obtained by reacting polyfunctional organosilanes or their mixtures with alkoxides, metal oxides or metal oxide-hydroxides, by adding preparations of polythiophenes while stirring. In order to obtain homogeneous mixtures the components are preferably diluted with solvents that are at least partially water-miscible, since the polythiophene preparation can in general only be prepared as a dilute aqueous solution and with the latter homogeneous mixtures can as a rule only be obtained in a narrow range in the reactive solution.

It is moreover also possible to add the corresponding monomers, for example 3,4-ethylenedioxythiophene to the reaction solution and to polymerise it, for example in the presence of iron sulfonate.

As solvents with which the reaction solutions may be diluted before adding the polythiophene preparations, there may be mentioned by way of example alcohols such as methanol, ethanol, isopropanol, n-butanol, sec.-butanol, ethylene glycol or glycerol, ketones such as acetone or methyl ethyl ketone, and amides such as N,N-dimethylformamide or N-methylpyrrolidone. Mixtures of two or more solvents may also be used.

Preferably the amount of polythiophene salts in the mixtures according to the invention is 0.1 to 20 wt. %, preferably 1 to 10 wt. %, referred to the sum of the components A), B) and C).

The mixtures according to the invention contain solvents as component E). These solvents serve to produce a homogeneous mixture of the individual components. The mixtures according to the invention may contain as solvents water, inorganic acids such as hydrochloric acid, or organic solvents. Organic solvents may for example include alcohols such as methanol, ethanol, isopropanol, n-butanol, sec.-butanol, ethylene glycol or glycerol, ketones such as acetone or methyl ethyl ketone, amides such as N,N-dimethylformamide or N-methylpyrrolidone, or organic acids such as formic acid. Generally the mixtures according to the invention contain a mixture of solvents, since the components necessary for preparing the mixtures according to the invention are mostly used in dissolved form.

In a particular embodiment an organosilane of the formula Si[(CH$_2$)$_2$Si(OH)(CH$_3$)$_2$]$_4$ is first of all reacted in the presence of tetraethyl orthosilicate (1 mole:4moles) in ethanol with water and formic acid to prepare the mixtures according to the invention; after one hour's reaction time the reaction mixture is diluted with n-butanol and ethylene glycol and an aqueous solution is added to a preparation of poly-3,4-ethylenedioxythiophene/polystyrenesulfonic acid.

Inorganic-organic hybrid materials are obtained by removing the solvent from the mixtures according to the invention. These hybrid materials can be used for example as an antistatic and/or conducting surface coating.

For this purpose the mixtures according to the invention are applied to surfaces; after the evaporation of the solvents and the hardening of the formed organic-inorganic hybrid material, conducting, scratch-resistant coatings are obtained.

The coating of surfaces with the mixtures according to the invention may be effected by conventional techniques, for example spraying, application with a doctor blade, dipping, flow coating or spin coating.

The applied layer of inorganic-organic hybrid material will preferably have a thickness of 20 nm to 100 μm, particularly preferably of 100 nm to 10 μm. The conductivity of the layers is preferably 0.2 to $10^8 \Omega/\square$, particularly preferably 100 to $10^8 \Omega/\square$.

The coatings are hardened at temperatures of 15° C. to 250° C., preferably 50° C. to 200° C., particularly preferably 100° C. to 200° C.

Surfaces of moulded parts and films of inorganic or organic materials such as plastics may for example be coated with the mixtures according to the invention. Examples of suitable plastics are those based on polyethylene, polypropylene, polyesters such as polyethylene terephthalate and polyethylene naphthalate, polystyrene, polycarbonate, ABS, polyacrylate, polyacrylonitrile, cellulose derivatives such as cellulose acetate, polyamides, polyvinyl chloride, optionally glass fibre-reinforced epoxy resins, as well as copolymers or blends of the aforementioned polymers.

The mixtures according to the invention are particularly suitable for coating inorganic moulded parts of materials such as glass or ceramics, for example materials containing aluminium oxide, silicon carbide or silicon nitride.

The mixtures according to the invention are preferably used for the antistatic and/or conducting coating of glass cathode ray tubes.

The invention is further illustrated in the following examples. All references to parts and percentages are by weight unless otherwise indicated.

EXAMPLES

A ca. 1.3% poly-3,4-ethylenedioxythiophene/polystyrene sulfonate solution (PEDT/PSS) in water is used as conducting organic polymer.

The polyfunctional organosilanes that are used, for example $Si[(CH_2)_2Si(OH)(CH_3)_2]_4$ or cyclo-$[OSiMe((CH_2)_2Si(OEt)_2Me)]_4$, were prepared by hydrosilylation of tetravinyl silane or cyclo-$[OSiMe(C_2H_3)]_4$ with $HSiClMe_2$ or $HSiCl_2Me$, followed by hydrolysis and alcoholysis. Further details may be found in DE-OS 196 03 242 and German Patent Application 196 03 241 5.

The surface resistance was measured according to the details given in DIN IEC 93. For this purpose two 5 mm wide and 5 cm long conducting silver strips were applied at a distance of 5 cm apart to the sample surface. The conducting silver strips were hardened, unless otherwise stated, by heating for 15 minutes at 160° C.

The pencil hardness was measured according to the instructions given in ASTM D 3363.

Example 1

(a) 20 g of $Si[(CH_2)_2Si(OH)(CH_3)_2]_4$, 50 ml of ethanol, 40 ml of tetraethyl orthosilicate (TEOS), 10 ml of water and 6 ml of formic acid were combined in this order while stirring and then stirred for a further 90 minutes.

(b) 40 ml of ethylene glycol, 40 ml of n-butanol and 40 ml of the PEDT/PSS solution were added while stirring to 40 ml of the solution from (a). Three glass plates were spray coated with this homogeneous mixture, using nitrogen as carrier gas. The coatings were then immediately dried for 15 minutes at 160° C.; after drying, the surface resistance was measured.

| Sample | Surface resistance [Ω/□] | Layer thickness |
|---|---|---|
| 1 | 15000 | <0.5 μm |
| 2 | 12000 | 1.4 μm |
| 3 | 12000 | not measured |

All films were transparent.

(c) The mixture prepared according to (b) was stored for 2 days in a refrigerator (ca. 4° C.), following which no change was observed. The homogeneous mixture was then applied by means of a doctor blade (wet film thickness 120 μm) to a glass plate and the surface resistance was measured.

| Sample | Surface resistance [Ω/□] | Surface thickness |
|---|---|---|
| 4 | 2200 | 4.8 μm |

The coating was crack-free, transparent and homogeneous.

Example 2

(a) 10 g of $Si[(CH_2)_2Si(OH)(CH_3)_2]_4$, 25 ml of ethanol, 20 ml of TEOS (tetraethyl orthosilicate), 5 ml of water and 3 ml of formic acid were combined in this order while stirring. After ca. 10 minutes the reaction mixture was filtered through normal filter paper and stirred for a further 80 minutes.

(b) 40 ml of ethylene glycol, 40 ml of n-butanol and 60 ml of the aqueous PEDT/PSS solution (previously filtered through cotton wool) were added while stirring vigorously to 40 ml of the lacquer solution from (a) and the whole was stirred for 10 minutes. The homogeneous mixture thus obtained was sprayed on glass plates using nitrogen as carrier gas, and the coating was hardened for 15 minutes at 160° C.

| Sample | Surface resistance [Ω/□] | Layer thickness | Transmission (400–700 nm) | Pencil hardness |
|---|---|---|---|---|
| 1 | 4200 | 1.7 μm | >83% | >7H |
| 2 | 5500 | 1.1 μm | >90% | >7H |

Both films were transparent.

Example 3

(a) 25 g of a 36.5% solution of cyclo-$[OSiMe((CH_2)_2Si(OH)Me_2)]_4$, 12.5 ml of TEOS, 3.2 ml of water and 2 ml of formic acid were combined in this order while stirring, and the mixture was then stirred for a further 75 minutes. A clear, colourless solution was obtained.

(b) The lacquer solution obtained according to (a) was diluted according to the Table by stirring with solvents, and finally mixed with the aqueous PEDT/PSS solution. Films of the homogeneous mixtures thus obtained were applied with a doctor knife in a wet film thickness of 120 μm to glass plates; these were dried for 10 minutes at room temperature and then for 15 minutes at 160° C.

| Sample | 1 | 2 | 3 | 4 |
|---|---|---|---|---|
| Laquer solution of (a) [ml] | 1 | 1 | 1 | 1 |
| Ethylene glycol [ml] | 0.5 | 0.5 | — | 1 |
| 1-butanol [ml] | 0.5 | 1 | — | — |
| NMP [ml] | 0.5 | — | 1 | — |
| 2-butanol [ml] | 0.5 | — | 1 | — |
| 1-propanol [ml] | 0.5 | — | — | 1 |
| PEDT/PSS [ml] | 1 | 0.5 | 1 | 1 |
| Pencil hardness | >7H | >6H | >7H | >7H |
| Surface resistance [kΩ/□] | 40 | 188 | 80 | 39 |

The conducting silver strips were hardened for 1 hour at 160° C. All films were crack-free, transparent and homogeneous.

Example 4

(a) 10 g of $Si[(CH_2)_2Si(OH)(CH_3)_2]_4$. 25 ml of ethanol, 20 ml of tetraethyl orthosilicate (TEOS), 5 ml of water and 3 ml of formic acid were combined in this order while stirring, and then stirred for a further 90 minutes.

(b) 40 ml of ethylene glycol, 40 ml of n-butanol and 40 ml of the PEDT/PSS solution were added while stirring to 20 ml of the solution from (a).

(c) 60 ml of ethylene glycol, 60 ml of n-butanol and 60 ml of the PEDT/PSS solution were added while stirring to 20 ml of the solution from (a).

The homogeneous mixtures from (b) and (c) were stored for 17 hours in a refrigerator. 3 glass plates were then spray coated, using nitrogen as carrier gas, and immediately afterwards dried for 15 minutes at 160° C. After cooling, the surface resistance was measured. Samples 1 to 3 were prepared using solution (b), samples 4 to 6 using solution (c).

| Sample | Surface resistance [Ω/□] | Layer thickness |
|--------|--------------------------|-----------------|
| 1 | 3400 | 0.8 μm |
| 2 | 2400 | 0.9 μm |
| 3 | 1700 | not measured |
| 4 | 1500 | not measured |
| 5 | 2500 | <0.5 μm |
| 6 | 2500 | <0.5 μm |

All films were transparent.

Example 5

(a) 40 ml of ethylene glycol, 40 ml of 1-butanol and 80 ml of the PEDT/PSS dispersion were added while stirring to 40 ml of the lacquer solution prepared according to Example 1 (a).

(b) ca. 5 mg of mica (Mica W1, manufacturer Norwegian Talc) were added while stirring to 2 ml of the mixture prepared according to (a). After 10 minutes' stirring a film (wet film thickness 120 μm) was applied to a glass plate using a doctor knife and hardened for 15 minutes at 160° C. The surface resistance of the sample was 690 Ω/□.

Example 6

20 g of cyclo-[OSiMe((CH$_2$)$_2$Si(OM)Me$_2$)]$_4$, 40 ml of isopropanol, 25.7 g of TEOS and 4.45 g of 0.1 N hydrochloric acid were combined while stirring and then stirred for a further hour. The mixture was then diluted with 60 ml of ethylene glycol and 22 ml of NMP. 1 ml of the PEDT/PSS dispersion and a further 0.25 ml of ethylene glycol were then added to 1.3 ml of this solution. After applying the solution to a glass plate using a doctor blade (wet film thickness 120 μm), the film was hardened for 1 hour at 140° C. after having evaporated the volatile constituents. After application of the conducting silver and stoving at 160° C. (15 minutes) the surface conductivity was measured and was found to be 225 Ω/□. The pencil hardness was 6 H.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A mixture comprising

A) a polythiophene preparation comprising polythiophene$^{m+}$, An$^{m-}$ wherein polythiophene cation polythiophene$^{m+}$ contains positively charged or uncharged units of formula (I)

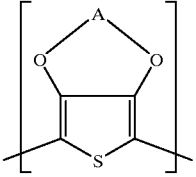

(I)

wherein

A represents a $C_1$–$C_4$-alkylene radical or a $C_1$–$C_4$-alkylene radical substituted with $C_1$–$C_{20}$-alkyl, —CH$_2$OH or $C_6$–$C_{14}$-aryl groups and An$^{m-}$ represents a polyanion;

B) a reaction product of a polyorganosilane corresponding to the following formulas $$R^3{}_{4-i}Si[(CH_2)_nSi(OR^4)_aR^5{}_{3-a}]_i \quad (II)$$

wherein i is 2 to 4, n is 1 to 10, $R^3$ represents alkyl or aryl, $R^5$ represents alkyl or aryl, a is 1 to 3 and $R^4$ represents alkyl or aryl, provided that when a is 1, $R^4$ may also be hydrogen;

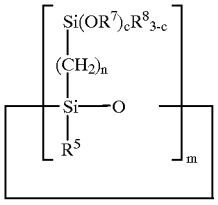

(III)

wherein m is 3 to 6, n is 2 to 10, $R^6$ represents $C_1$–$C_6$ alkyl or $C_6$–$C_{14}$ aryl, $R^8$ represents alkyl or aryl, c is up to 3 and $R^7$ represents alkyl or aryl, provided that when c is 1, $R^7$ may also be hydrogen; and $$Si[OSiR^{11}{}_2(CH_2)_pSi(OR^9)_dR^{10}{}_{3-d}]_4 \quad (IV)$$

wherein p is 1 to 10, $R^{11}$ represents alkyl or aryl, $R^{10}$ represents alkyl or aryl, d represents 1 to 3 and $R^9$ represents alkyl or aryl, provided that when d is 1, $R^9$ may also be hydrogen;

C) optionally a reaction product of an alkoxide of the elements B, Al, Si, Sn, Ti, Zr, D) optionally a metal oxide or metal oxide-hydroxide of the elements B, Al, IN, Si, Sn, Ti, Zr, and E) a solvent.

2. An inorganic-organic hybrid material obtained from the mixture of claim 1 by removing the solvent.

* * * * *